United States Patent
Woo et al.

(10) Patent No.: US 6,824,116 B1
(45) Date of Patent: Nov. 30, 2004

(54) VALVE OF INFRARED OPERATED AUTOMATIC WATER SUPPLIER

(76) Inventors: Alex Woo, No. 10-16, Tung Chih Lane, Hsi Tun Dist., Taichung City (TW); Yu Ting Kuo, No. 10-16, Tung Chih Lane, Hsi Tun Dist., Taichung City (TW)

( * ) Notice: Subject to any disclaimer, the term of this patent is extended or adjusted under 35 U.S.C. 154(b) by 0 days.

(21) Appl. No.: 10/739,062

(22) Filed: Dec. 19, 2003

(51) Int. Cl.[7] ............................................. F16K 31/02
(52) U.S. Cl. ............................ 251/129.04; 251/129.17
(58) Field of Search ........................... 251/30.01, 30.02, 251/30.03, 30.04, 129.04, 129.17, 357, 334

(56) References Cited

U.S. PATENT DOCUMENTS

| | | | |
|---|---|---|---|
| 3,740,019 A | * 6/1973 | Kessell et al. | 251/129.17 |
| 4,948,090 A | * 8/1990 | Chen | 251/129.04 |
| 5,386,849 A | * 2/1995 | Gilchrist et al. | 251/129.17 |
| 5,449,142 A | * 9/1995 | Banick | 251/30.04 |
| 5,699,833 A | * 12/1997 | Tsataros | 251/129.04 |
| 5,707,039 A | * 1/1998 | Hamilton et al. | 251/129.17 |
| 5,758,864 A | * 6/1998 | Asai | 251/129.17 |
| 5,915,665 A | * 6/1999 | Paese et al. | 251/30.04 |
| 6,076,550 A | * 6/2000 | Hiraishi et al. | 251/30.03 |

* cited by examiner

Primary Examiner—Eric Keasel
(74) Attorney, Agent, or Firm—Troxell Law Office PLLC

(57) ABSTRACT

A valve structure of an infrared operated automatic water supplier includes a three-branch tube, a solenoid valve, and a pressure-balance switch unit wherein the three-branch tube has a projected tube flange protruding at the inner side of an actuation opening therein correspondingly matched to a water outlet thereof. The pressure-balance switch unit, made up of a membrane, an actuation ring plate, a sealing sleeve, a spring element, and a retaining mount, is adapted at the actuation opening of the three-branch tube therein with the membrane thereof correspondingly located on top of the projected tube flange thereof to form a first layer of sealing effect thereof, and a conic guide face of the sealing cap smoothly forced into the projected tube flange in abutting engagement therewith. Sustained by a lower engaging plate of the actuation ring plate adapted at the inner side therein, the sealing cap is tightly abutted against the inner wall of the projected flange at the outer side thereof, forming a second layer of sealing design thereof to achieve a more efficient sealing effect of the solenoid water valve structure thereof. Besides, the assembled solenoid water valve is housed at an upper/lower shelter cases having a relayed water discharge switch, a weak power indicator, an infrared sensory unit, and a power supply unit adapted therein.

4 Claims, 5 Drawing Sheets

VALVE OF INFRARED OPERATED AUTOMATIC WATER SUPPLIER

BACKGROUND OF THE INVENTION

The present invention is related to a valve structure of an infrared operated automatic water supplier, comprising a three-branch tube, a solenoid valve, and a pressure-balance switch unit wherein the three-branch tube has a projected tube flange protruding at the inner side of an actuation opening correspondingly matched to a water outlet thereof, and the pressure-balance switch unit, made up of a membrane, an actuation ring plate, a sealing cap, a spring element, and a retaining mount, is located at the three-branch tube and the solenoid valve there-between; whereby, to stop the discharge of water, the membrane thereof is correspondingly placed on top of the projected tube flange thereof to form a first layer of sealing effect thereof, and a conic guide face of the sealing cap is smoothly forced into the projected tube flange thereof in abutting engagement therewith. Sustained by a lower engaging plate of the actuation ring plate adapted at the inner side thereof, the sealing cap is tightly abutted against the inner wall of the projected tube flange at the outer side thereof, forming a second layer of sealing design thereof to achieve a more efficient sealing effect of the solenoid water valve structure thereof.

A conventional valve of infrared operated automatic water supplier is characterized by that of a pressure-balance switch unit adapted at a three-branch tube therein with a membrane of the pressure-balance switch unit levelly abutted against a projected tube flange of the three-branch tube thereof. Yet, in case a spring element adapted at the pressure-balance switch unit thereof gets elastic fatigue in use, the membrane thereof can't be precisely abutted tight against the projected tube flange of the three-branch tube thereof. Thus, water can easily leak out from the gap between the membrane and the projected tube flange thereof due to the insufficient sealing of the membrane thereon.

SUMMARY OF THE PRESENT INVENTION

It is, therefore, the primary purpose of the present invention to provide a valve of infrared operated automatic water supplier, including a three-branch tube, a solenoid valve, and a pressure-balance switch unit wherein the pressure-balance switch unit, made up of a membrane, an actuation ring plate, a sealing cap, a spring element, and a retaining mount, is adapted at an actuation opening of the three-branch tube therein with the membrane thereof correspondingly located on top of a projected tube flange of the three-branch tube thereof to form a first layer of sealing effect thereof, and a conic guide face of the sealing cap thereof smoothly forced into the projected tube flange in abutting engagement therewith. Sustained by a lower engaging plate of the actuation ring plate adapted at the inner side thereof, the sealing cap is tightly abutted against the inner wall of the projected flange at the outer side thereof, forming a second layer of sealing design thereof to achieve a more efficient sealing effect of the solenoid water valve structure thereof.

DETAILED DESCRIPTION OF THE PREFERRED EMBODIMENTS

Figure 1:
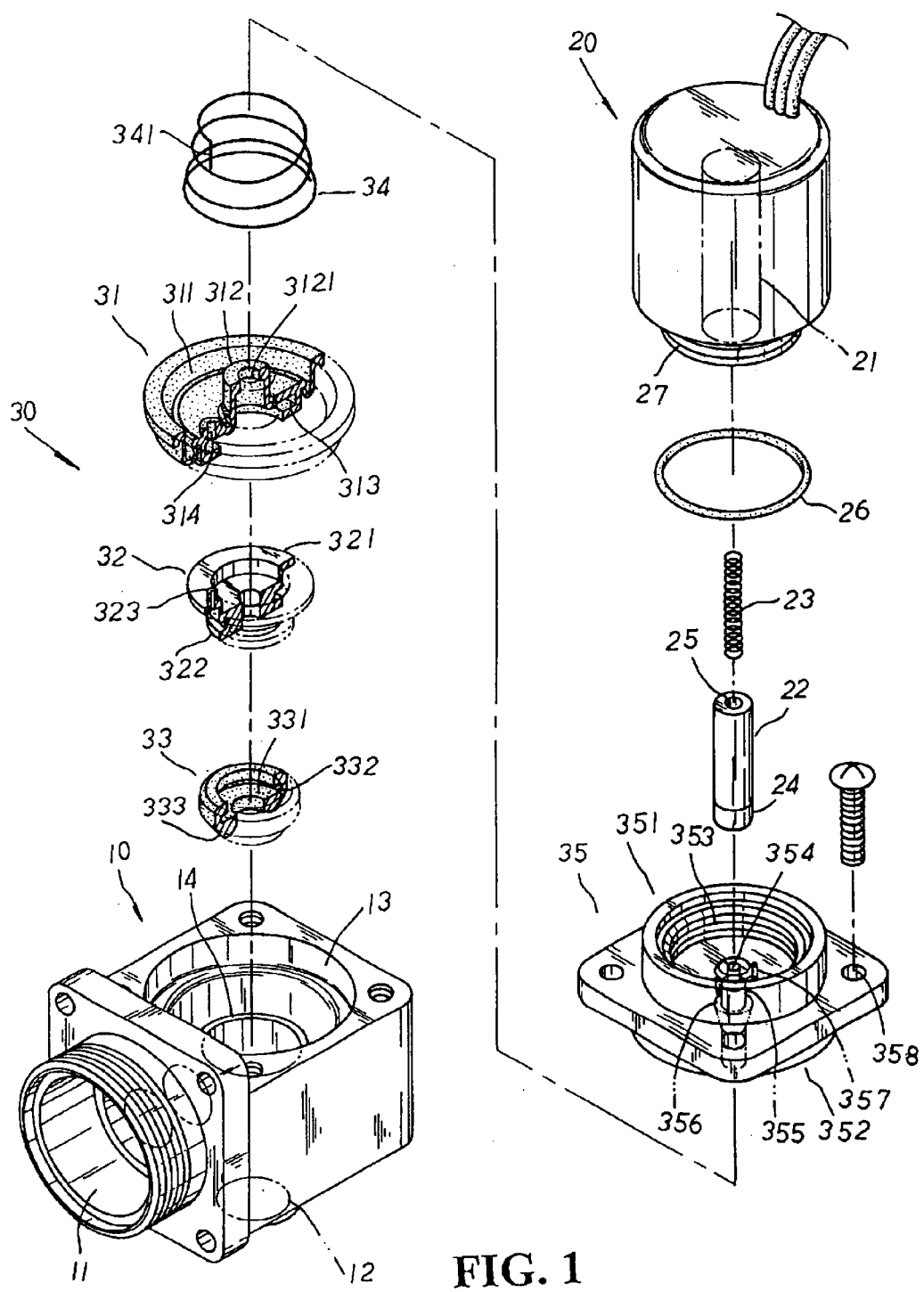
FIG. 1 is a perspective exploded view of the present invention.

Please refer to FIG. 1. The present invention is related to a valve structure of an infrared operated automatic water supplier, comprising a three-branch tube 10, a solenoid valve 20, and a pressure-balance switch unit 30. The three-branch tube 10 is provided with a water inlet 11, a water outlet 12, and an actuation opening 13 at the three sides thereof respectively wherein a projected tube flange 14 is protruding at the inner side of the actuation opening 13 thereof, correspondingly matched to the water outlet 12 thereof. The solenoid valve 20 has an actuation groove 21 disposed at the center therein for a sensory rod 22 with a spring 23 adapted therein to be engaged therewith. The sensory rod 22 is provided with a water sealing block 24 disposed at one end thereof, and a receiving groove 25 disposed at the other end thereof for the spring 23 thereof to be retained therein. The solenoid valve 20 also includes an externally threaded section 27 defining at one end thereof, to which a sealing washer 26 is adapted. The pressure-balance switch unit 30 is made up of a membrane 31, an actuation ring plate 32, a sealing cap 33, a spring element 34, and a retaining mount 35. The membrane 31, a plate embodiment of elastic rubber, has a retaining cavity 311 indented at the top thereof, a coupling tube 312 with a central through hole 3121 protruding at the center thereof, a transverse U-shaped annular coupling groove 313 disposed under the retaining cavity 311 thereof, and a coupling through hole 314 disposed at one side of the coupling tube 312 thereof. The actuation ring plate 32 is provided with an upper and a lower annular engaging plate 321, 322 at the top and bottom sides thereof respectively, and an engaging tube 323 protruding at one side of the upper engaging plate 321 thereon. The sealing cap 33, made of elastic rubber material, has an annular cavity 331 indented at the top thereof, a lower engaging groove 332 defining the inner periphery of the annular cavity 331 thereon, and a conic guide face 333 protruding at the bottom thereof. The spring element 34 is multi-turned into a conic shape with a probing pin 341 extending downwards from the top thereof. The retaining mount 35, a board-like seat, has an upper and a lower retaining spaces 351, 352 defining at both top and bottom sides thereon respectively wherein an internally threaded hole 353 is disposed at the upper retaining space 351 thereon, and a central groove 354 is disposed at the inner side of the internally threaded hole 353 thereof. A sleeve rod 355 with an inverted conic stop flange 356 extending downwards thereon is protruding at the bottom of the central groove 354 thereof, and a pair of symmetrical through holes 357 are disposed at both sides of the central groove 354 thereon. A multiple of screw holes 358 are distributed around the outer periphery of the internally threaded hole 353 thereof.

Figure 2:
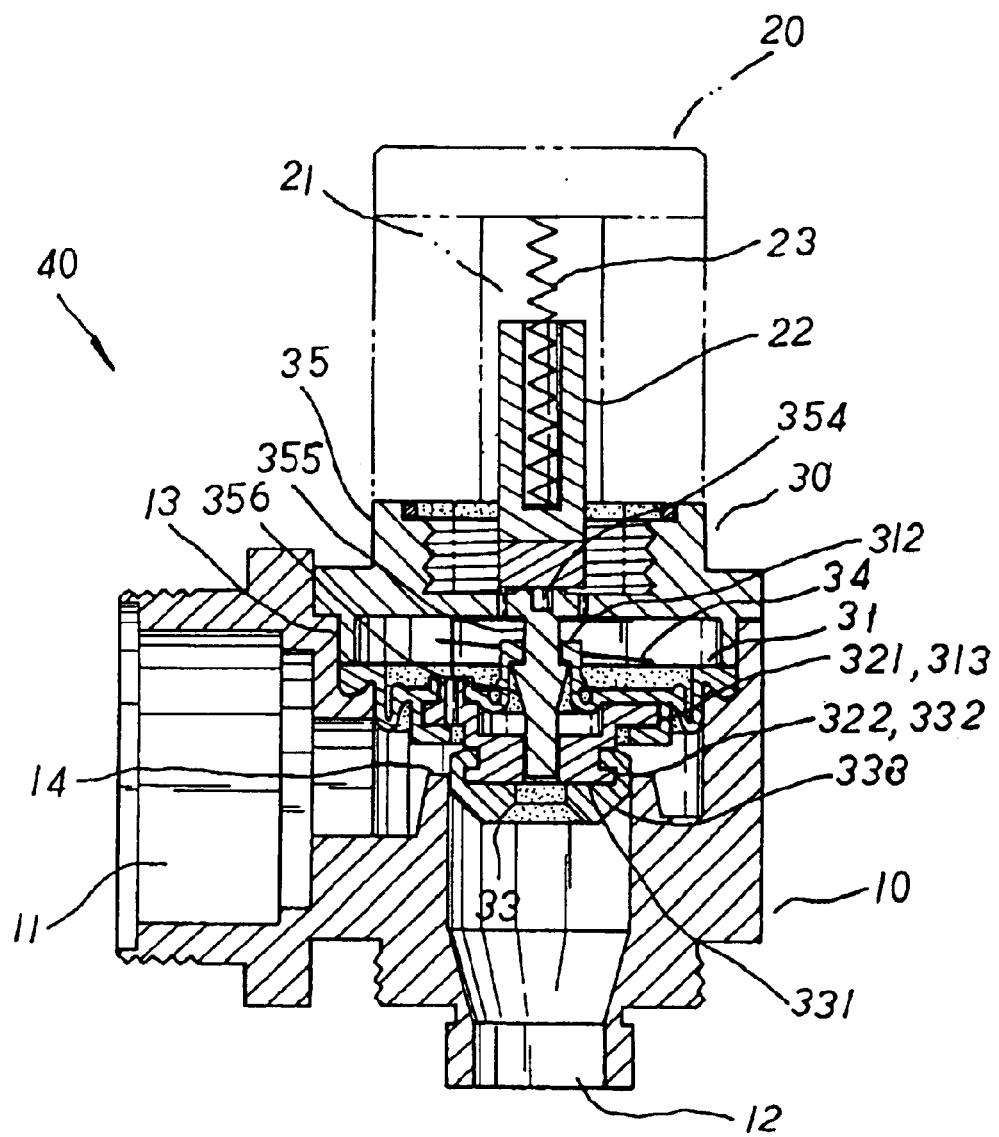
FIG. 2 is a cross sectional view of the present invention in assembly.

Please refer to FIG. 2. In assembly, the upper engaging plate 321 of the actuation ring plate 32 is registered with the annular coupling groove 313 of the membrane 31 with the engaging tube 323 thereof adapted at the coupling through hole 314 in sleeve engagement therewith, and the lower engaging plate 322 thereof is inserted into the lower engaging groove 332 of the sealing cap 33 and tightly abutted against the annular cavity 331 therein. The spring element 34 is located onto the retaining cavity 311 thereof with the probing pin 341 thereof correspondingly matched to the coupling through hole 314 thereof. The coupling tube 312 of the membrane 31 is led and joined to the sleeve rod 355 of the retaining mount 35 till located by the inverted conic stop flange 356 thereof in abutting engagement thereby. Thus, the coupling tube 312 thereof is elastically abutted tight against the inner wall of the sleeve rod 355 thereof,.and the probing pin 341 is pressed to extend downwards at the coupling hole 314 therein to complete the assembly of the pressure balance switch unit 30 thereof. The assembled pressure-balance switch unit 30 is then led from top to bottom to be retained at the actuation opening 13 of the three-branch tube 10 therein with the membrane 31 thereof correspondingly located on top of the projected flange 14 thereof to form a first layer of sealing effect thereof. Meanwhile, the conic guide face 333 of the sealing cap 33 is smoothly guided along the projected tube flange 14 thereof and securely retained therein. Sustained by the lower engaging plate 322 of the actuation ring plate 32 adapted at the inner side thereof, the sealing cap 33 is tightly abutted against the inner wall of the projected flange 14 at the outer side thereof, forming a second layer of sealing effect thereof. The screw holes 358 of the retaining mount 35 are securely fixed to the three-branch tube 10 thereof via screws, and the externally threaded section 27 of the solenoid valve 20 is screwed up to the internally threaded hole 353 of the retaining mount 35 for location thereby. Thus, the water sealing block 24 of the solenoid valve 20 is tightly abutted on top of the central groove 354 of the retaining mount 35, forming a vacuum seal at the through holes 357 therein to complete the assembly of a solenoid water valve 40.

Figure 3:
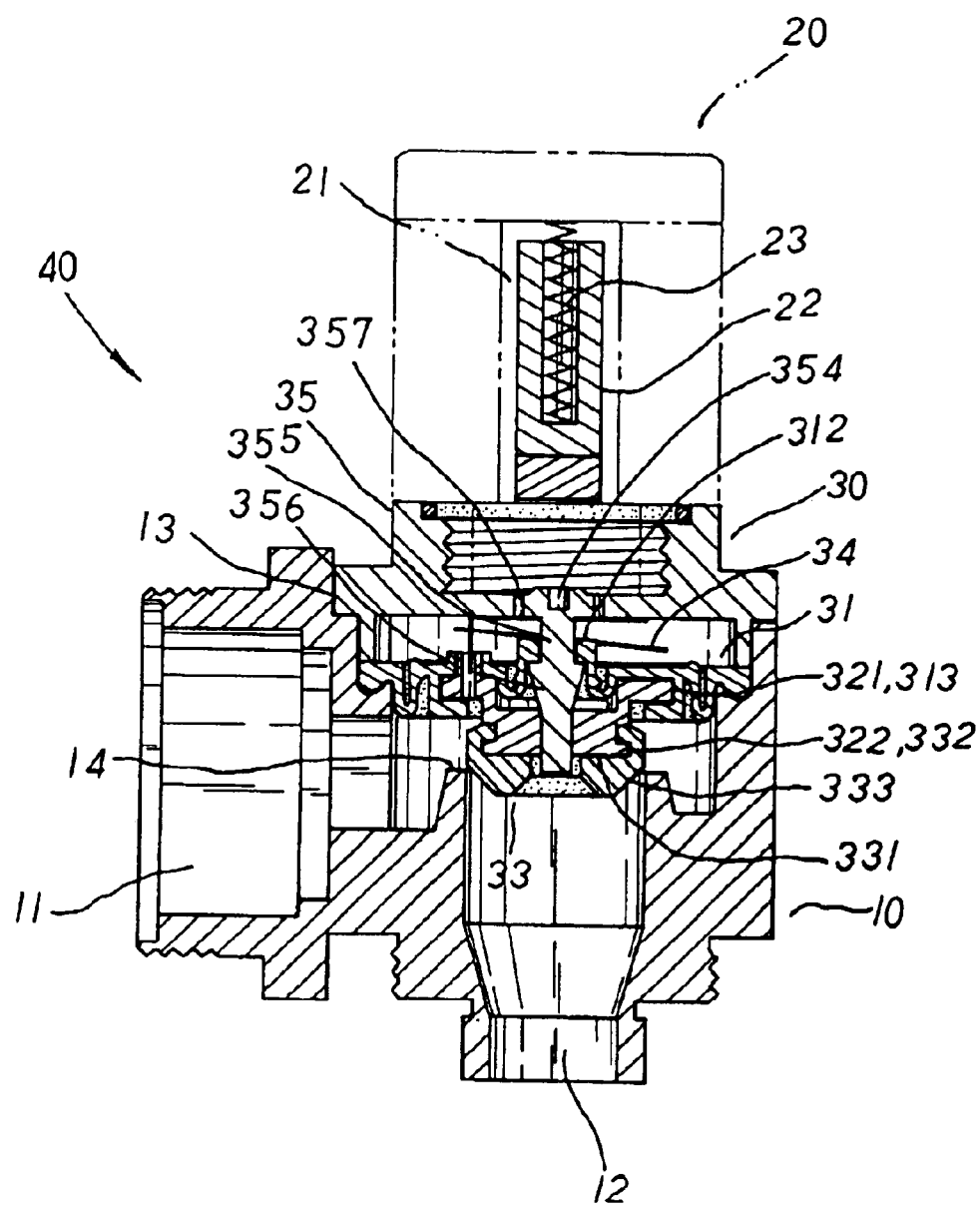
FIG. 3 is a cross sectional view of the present invention in water discharge.

Please refer to FIG. 3. Due to the vacuum seal formed by the water sealing block 24 thereof and the through holes 357 thereof, the water sealing block 24 of the solenoid valve 20, when raised upwards, will suck the membrane 31 upwards and activate the actuation ring plate 32 as well as the sealing cap 33 to move upwards therewith. The sealing cap 33 lifted upwards will detach from the projected tube flange 14 of the three-branch tube 10 to communicate the water inlet 11 and the water outlet 12 thereof for the discharge of water. To stop the water discharge, the spring element 34 compressed tight at the membrane 31 therein will bounce back to relocate the membrane 31 thereof and seal up the projected tube flange 14 of the three-branch tube 10 via the sealing cap 33 in two layers of sealing effects thereof.

Figure 4:
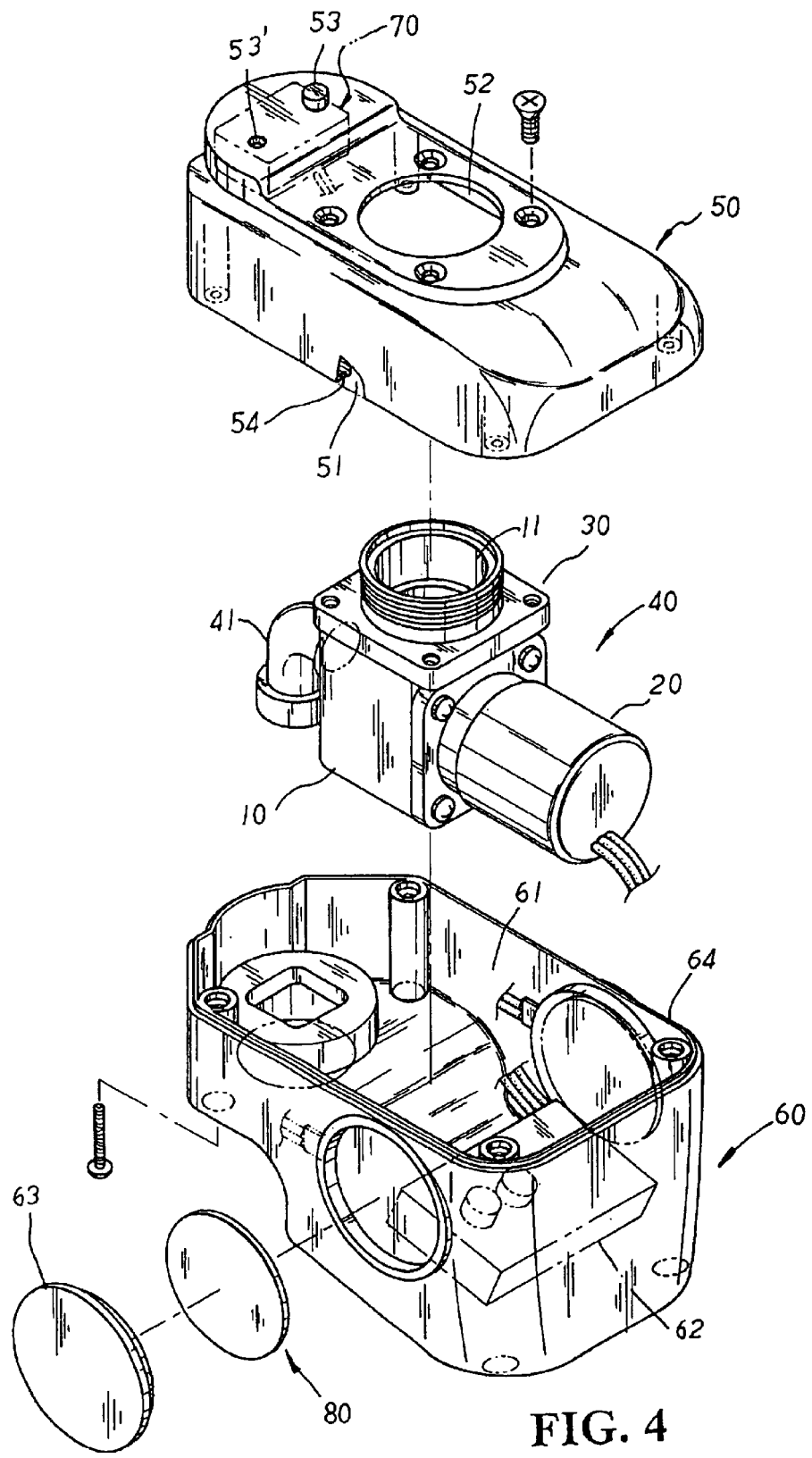
FIG. 4 is a perspective exploded view of the present invention housed at an upper/lower shelter cases having an infrared sensory unit adapted therein.
Figure 5:
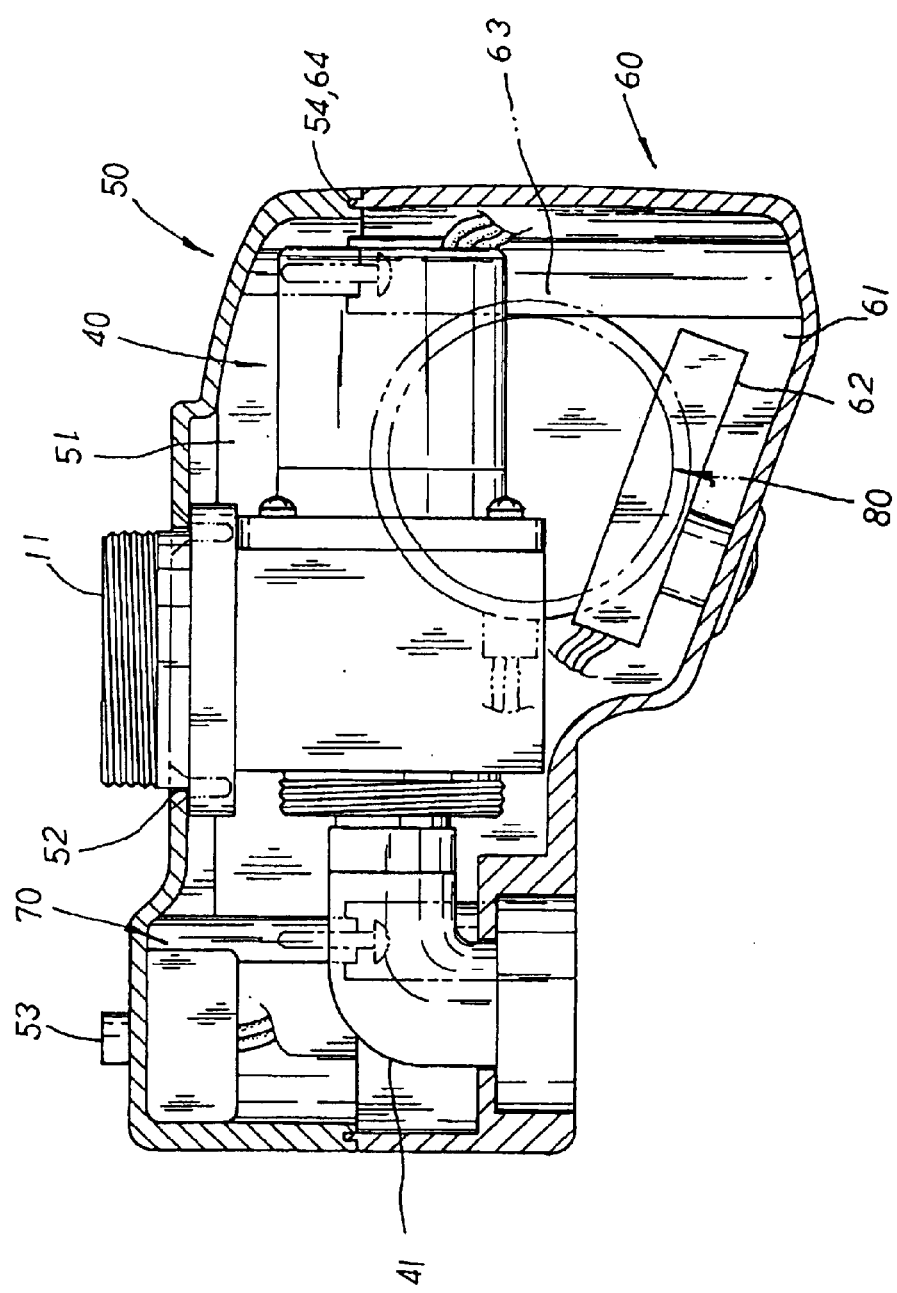
FIG. 5 is a cross sectional view of the present invention mounted onto the upper/lower shelter cases thereof in assembly.

Please refer to FIGS. 4 to 5 inclusive. The solenoid water valve 40 thereof can be adapted to an upper and a lower shelter cases 50, 60, and housed at an upper and a lower retaining spaces 51, 61 of the upper/lower shelter cases 50, 60 respectively therein. The upper shelter case 50 has a retaining hole 52 defining at one side thereon for the water inlet 11 of the three-branch tube 10 thereof to extend there-from, and the upper retaining space 51 has an IC control unit 70 adapted at one side therein correspondingly matched to a coupling tube 41 of the solenoid water valve 40 thereof A relayed water discharge switch 53, and a weak power indicator 53' are correspondingly located on top of the IC control unit 70 to control the time of water discharge and the status of power supply thereby. An inverted U-shaped engaging groove 54 is disposed, defining the bottom opening edge of the upper shelter case 50 thereon. The lower retaining space 61 of the lower shelter case 60 has an infrared sensory unit 62 adapted at one side therein to be connected with the solenoid valve 20 of the solenoid water valve 40 thereof. A pair of battery plates 63 with power supply units 80 adapted thereto are symmetrically engaged at both sides of the lower shelter case 60 relative to the position of the infrared sensory unit 62 thereof with the power supply units 80 thereof linked to the control panel of the infrared sensory unit 62 thereof. The lower shelter case 60 also has an engaging rib 64 protruding at the top opening edge thereon to be registered with the engaging groove 54 of the upper shelter case thereby.

What is claimed is:

1. A valve structure of an infrared operated automatic water supplier, comprising a three-branch tube, a solenoid valve, and a pressure-balance switch unit wherein the three-branch lube has a water inlet, a water outlet, and an actuation opening disposed at the three sides respectively, and a projected tube flange protruding at the inner side of the actuation opening thereof, correspondingly matched to the water outlet thereof; the solenoid valve has an actuation groove disposed at the center therein for a sensory rod with a spring adapted therein to be engaged therewith wherein the sensory rod is provided with a water sealing block disposed at one end thereof, and a receiving groove disposed at the other end for the spring thereof to be retained therein; the solenoid valve also includes an externally threaded section defining at one end hereof, to which a sealing washer is adapted; the pressure-balance switch unit is made up of a membrane, an actuation ring plate, a sealing sleeve, a spring element, and a retaining mount; the present invention being characterized by that, the membrane, a plate embodiment of elastic rubber, having a retaining cavity indented at the top thereof for the spring element thereof to be retained therein, a coupling tube with a central through hole protruding at the center thereof to be engaged with a sleeve rod of the retaining mount thereof and abutted against a stop flange of the sleeve rod thereof for location thereby, a transverse U-shaped annular coupling groove disposed under the retaining cavity thereof, and a coupling through hole disposed at one side of the coupling tube thereof;

the actuation ring plate having an upper and lower annular engaging plates disposed at the top and bottom sides thereof respectively, and an engaging tube protruding at one side of the upper engaging plate thereon to be adapted at the coupling through hole of the membrane therein;

the scaling cap, made of elastic rubber material, having an annular cavity indented at the top thereof, a lower engaging groove defining the inner periphery of the annular cavity thereon, and a conic guide face protruding at the bottom thereof;

the spring element being multi-turned into a conic shape with a probing pin extending downwards from the top thereof;

the retaining mount, having an upper and a lower retaining spaces defining both top and bottom sides thereon respectively, being provided with an internally threaded hole at the upper retaining space, a central groove disposed at the inner side of the internally threaded hole thereof, and a pair of symmetrical through holes disposed at both sides of the central groove thereon;

in assembly, the pressure-balance switch unit is adapted at the actuation opening of the three-branch tube therein with the membrane thereof correspondingly located on top of the projected tube flange thereof to form a first layer of sealing effect thereof, and the conic guide face of the sealing cap smoothly forced into the projected tube flange in abutting engagement therewith; sustained by the lower engaging plate of the actuation ring plate adapted at the inner side therein, the sealing cap is tightly abutted against the inner wall of the projected tube flange at the outer side thereof, forming a second layer of sealing design to achieve a more efficient sealing effect of the solenoid water valve structure thereof.

2. The valve of infrared operated automatic water supplier as claimed in claim 1 wherein the solenoid water valve thereof can be housed at an upper and lower shelter cases having a relayed water discharge switch, a weak power indicator, an infrared sensory unit, and a power supply unit adapted therein.

3. The valve of infrared operated automatic water supplier as claimed in claim 2 wherein the opening edges of the upper and lower shelter cases thereof are provided with an engaging groove and an engaging rib thereon respectively for mutual engagement thereby.

4. The valve of infrared operated automatic water supplier as claimed in claim 1 wherein the stop flange protruding at the bottom of the sleeve rod of the retaining mount thereof is formed of an inverted conic shape.

* * * * *